United States Patent [19]

Baier et al.

[11] Patent Number: 5,716,842
[45] Date of Patent: Feb. 10, 1998

[54] MINIATURIZED FLOW THERMOCYCLER

[75] Inventors: Volker Baier, Jena; Ulrich Bodner, Adelebsen; Ulrich Dillner, Jena; Johann Michael Köhler, Golmsdorf; Siegfried Poser, Jena; Dieter Schimkat, Göttingen, all of Germany

[73] Assignee: Biometra Biomedizinische Analytik GmbH, Goettingen, Germany

[21] Appl. No.: 649,632

[22] PCT Filed: Sep. 12, 1995

[86] PCT No.: PCT/EP95/03580

§ 371 Date: May 23, 1996

§ 102(e) Date: May 23, 1996

[87] PCT Pub. No.: WO96/10456

PCT Pub. Date: Apr. 11, 1996

[30] Foreign Application Priority Data

Sep. 30, 1994 [DE] Germany .............. 44 35 107.0

[51] Int. Cl.⁶ .................................. C12M 3/00
[52] U.S. Cl. .................. 435/283.1; 435/289.1; 435/293.1; 422/68.1; 422/82.11; 422/102; 422/109; 422/198
[58] Field of Search ............ 435/283.1, 289.1, 435/293.1, 305.1, 305.4; 422/109, 198, 68.1, 82.11, 63, 102, 58

[56] References Cited

U.S. PATENT DOCUMENTS

| 5,270,183 | 12/1993 | Corbett et al. ............ 435/91.2 |
| 5,498,392 | 3/1996 | Wilding et al. ............ 422/68.1 |
| 5,587,128 | 12/1996 | Wilding et al. ............ 422/50 |

FOREIGN PATENT DOCUMENTS

| 2650657 | 2/1991 | France .............. F27B 17/02 |
| WO/9116966 | 11/1991 | WIPO ............... B01D 57/02 |
| WO/9213967 | 8/1992 | WIPO ............... C12Q 1/68 |
| WO/9322058 | 11/1993 | WIPO ............... B01L 7/00 |
| WO/9405414 | 3/1994 | WIPO ............... B01F 11/02 |

OTHER PUBLICATIONS

"Molekulare Zellbiologie", (by Darnell, J.; Lodish, H.; Baltimore, D., published by Walter de Gruyter, Berlin–New York 1994, pp. 256–257).

"DNA Amplification With A Microfabricated Reaction Chamber", (by M. Allen Northrup, Michael T. Ching, Richard M. White, and Robert T. Watson, 7th International Conference on Solid State Sensors and Actuators, Proc. Transducers 1993, pp. 924–926).

Primary Examiner—David A. Redding
Attorney, Agent, or Firm—Jordan and Hamburg

[57] ABSTRACT

A miniaturized thermocycler is provided for carrying out thermally controlled biochemical or biological melecular processes, in particular polymerase chain reactions. The aim of the invention is to provide a miniaturized thermocycler which enables such reactions to be carried out more effectively, avoids the problem of parasitic heat absorbers and can be manufactured inexpensively in series. This aim is achieved by virtue of the fact that the sample holder (1) is designed as a series of meanders winding in a plane, the sample holder (1) has a groove in a wall and closed over by a cover, the groove passing alternately through comparable heating zones (2) and cooling zones (3), located at intervals along the groove, as it meanders.

11 Claims, 1 Drawing Sheet

MINIATURIZED FLOW THERMOCYCLER

BACKGROUND OF THE INVENTION

The invention relates to a miniaturized flow thermocycler applicable in thermally controlled biochemical and biological molecular processes, respectively, particularly for use in so-called polymerase chain reaction methods in which definite sequences out of a mixture of DNA sequences are amplified.

When carrying out thermally controlled biochemical and biological molecular processes, respectively, very often procedure steps at different temperatures are required. Such an exposure to varying temperatures is of particular importance in the so-called polymerase chain reaction.

The polymerase chain reaction method has been recently developed to amplify definite DNA sequences and its essential features have been outlined in "Molekulare Zellbiologie", Walter de Gruyter, Berlin-New York 1994, pg. 256/257 by Darnell, J.; Lodish, H.; Baltimore, D. Inter alia, it is essential in the method that mixtures of DNA sequences are subject to definitely varying temperatures. To this end stationary sample treatment devices are employed where the respective samples are inserted into reaction chambers for being subject to a periodical hot-cold-temperature cycle, the respectively desired DNA sequences being amplified depending on the specifically preselected primers. The efficiency of the reaction chambers known heretofore is considered insufficient. Therefore a miniaturized reaction chamber has recently been proposed (Northrup et al, DNA Amplification with Microfabricated reaction chamber, 7th International Conference on Solid State Sensors and Actuators, Proc. Transducers 1993, pg. 924–26), which permits a four-times faster amplification of desired DNA sequences compared to known arrangements. The reaction chamber which is capable to of receiving up to 50 μreaction fluid comprises a structurized silicon cell of a longitudinal extension on an order of size of 10 mm which is, in one sample injection direction, sealed by a thin diaphragm via which the temperature exposure is executed by miniaturized heating elements. Also with this device the DNA sequence to be amplified is inserted via micro-channels into the cell, subjected to a polymerase chain reaction and subsequently drawn off. Irrespective of the advantages obtained with the device, it still exhibits the disadvantage that the reaction chamber has to be heated and cooled in its entity which only permits limited rates of temperature changes. Particularly at a further reduction of the sample sizes, the parasitic heat capacity of the reaction chamber and, if employed, of a tempering block becomes more dominant to the reaction liquid so that the high temperature changing rates, otherwise feasible with small liquid volumes, cannot be achieved, which renders the efficiency of the method comparatively low. Additionally, a comparatively expensive control system is required to obtain a respectively stable temperature control of the reaction liquid furthermore, the heating and cooling power applied, respectively, is substantially consumed in the ambient units rather than in the reaction liquid.

Furthermore, a thermocycler operating on the flow principle is known from the U.S. Pat. No. 5,270,183 in which the reaction liquid to be amplified passes through a tube being subsequently wound once or multifold around a plurality of cylinders which are kept on different temperatures. As it is, such an arrangements permits amplification of even comparatively low sample amounts down to 25 μl. However, such a device is very difficult to handle and requires considerable skill on the side of the apparatus producer so that it is entirely unsuited for large scale production.

SUMMARY OF THE INVENTION

It is an object of the present invention provide a miniaturized thermocycler which, compared to the state of art, permits to more effective control of biochemical and biological molecular, respectively, processes and, in particular, the method for polymerase chain reaction, which obviates the problem of parasitic heat capacities and which is inexpensive in manufacture.

The invention is based on the idea to utilize structurizing technologies known from so-called microsystem techniques in order to provide reaction chambers which permit dynamic reaction treatment of even very low amounts of, partially, very expensive materials.

An embodiment of receptacle portions for receiving a sample material ensures that the sample portion volumes under treatment in respective heating and cooling zones are subjected to a homogeneous temperature which also increases the output of the substance to be amplified. Furthermore, due to the omission of heating and cooling processes of wall materials by virtue of the arrangement, and due to a severe minimizing of the parasitic heat absorption and heat affects, the expenditures for control systems are considerably reduced, apart from a remarkable reduction of time for the entire cycling process. Only as much heating and cooling power has to be fed in as carried in the reaction liquid stream. Additionally, the embodiment of the thermocycler not only permits a continuous process but also a serial operation in which different substances are subsequently injected into the thermocycler without the danger of mixing with sample materials still in the arrangement which is simply obtained by inserting a small buffer gas volume. The abovementioned advantages also ensure an automation of the method for polymerase chain reaction.

Furthermore, an easy combination with other methods is feasible such as the micro-gel-electrophoresis, the micro-capillary-chromatography and other micro separating and analyzing methods.

DETAILED DESCRIPTION OF THE INVENTION

Figure 1:
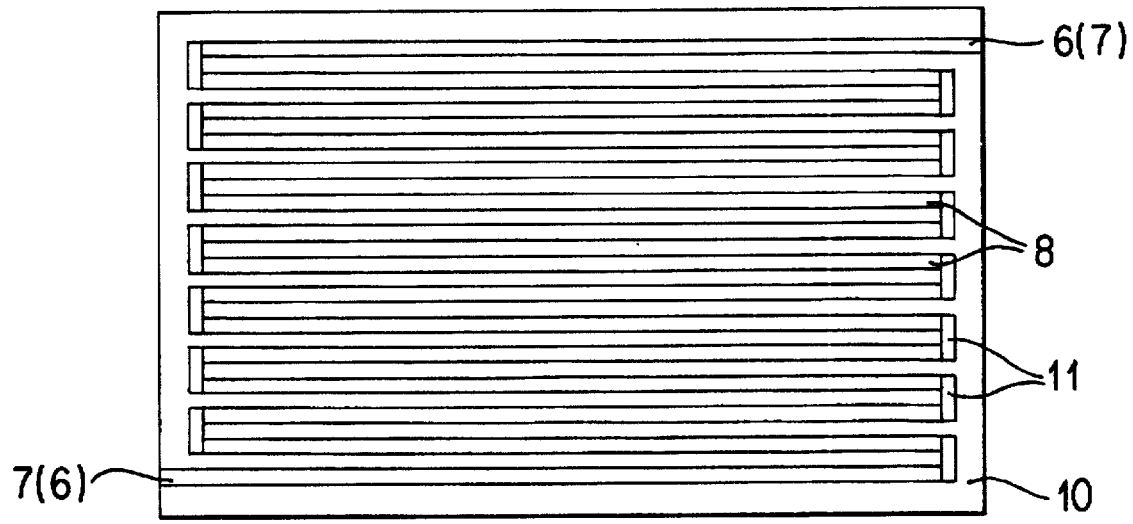
FIG. 1 shows a plan view of an inventional reaction chamber in which the path of the sample liquid is embodied by microstructured flow paths.
Figure 2:
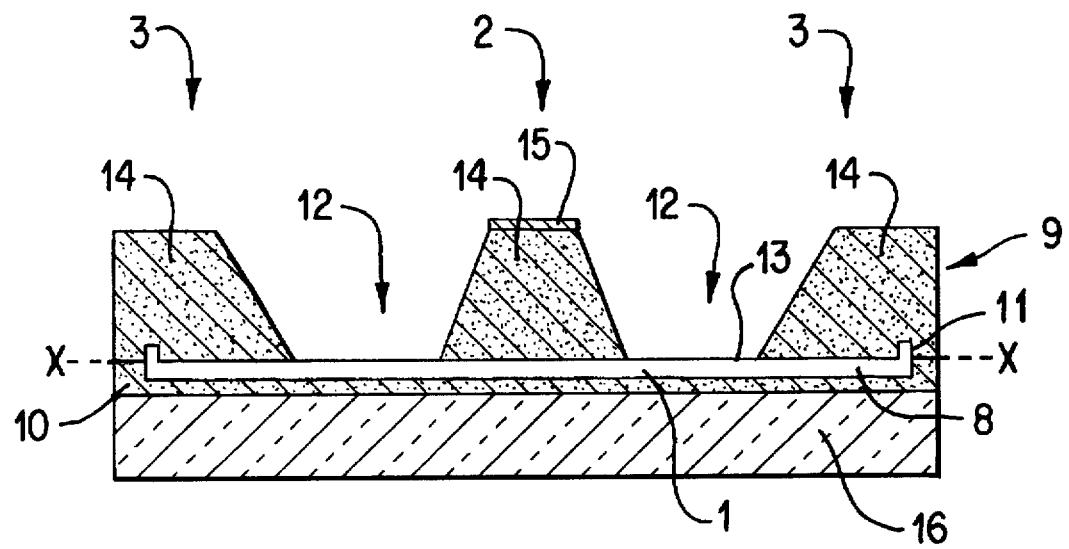
FIG. 2 shows a lateral section of a reaction chamber according to FIG. 1.

In FIG. 1 a reaction chamber, in which a sample liquid path, is embodied by a micro-structured low path is schematically represented. FIG. 2 shows a not-to-scale lateral section of the embodiment. In the embodiment grooves 8, which are in parallel to one another in the present example, are wet-chemically etched into a plate 10 having a size of about 10*15 mm and a thickness of 500 μm and being made of glass or silicon. Alternatively slots can be provided instead of the grooves 8, in this case the resulting frame, on the one side, is closed over its entire area by a solid plate. Further to the present example, the open groove ranges are closed by a cover 9 comprising components above the axis X—X, as shown in FIG. 2. According to the invention, the cover 9 is a silicon sheet in which two heat insulating notches 12 are provided. The notches form at their base portion a diaphragm-like seal 13 of about 1 μm thickness which covers the groove ranges constituting reaction liquid duration zones between heating and the cooling zones. In FIG. 2 the central silicon projection is provided with a thin-layer heating element 15 on its top which effects the heating of the sample material on its remote base. A thermo-regulated cooling system (not shown in detail) is provided on the two remaining lateral silicon projections of this embodiment. Bridging channels 11, provided in the cover 9, connect respective adjacent individual groove end portions to provide a continuous reaction liquid flow in the present example. It is feasible to provide the required inlets and outlets either in the plate 10 (as indicated in FIG. 1) or in the cover 9. In the example, the disclosed entire device is attached to a mount 16 made of a glass of low thermal conductivity. In the present example the individual grooves 8 have a width of 500 μm and a length of somewhat under 100 mm at a groove depth of 400 μm which yields an entire groove length of 0.4 m including the paths for the bridges. Suitably, it is feasible to inject sample volumes of about 10 to 200 μl into the flow thermocycler which corresponds to conventional sample amounts. Since the given groove dimensions do not by far exhaust the possibilities of, dimensions can already be produced today which permit the injection of sample volumes in an order of size of 0.1 μl for specific applications.

With the embodiment of FIGS. 1 and 2 an entire amplification cycle time of 40 min at a maximum output is attainable with feasible flow rates of about 0.1 μl/sec., duration of the samples in the heating zones for about 20 sec., in the cooling zones for 30 sec., and in the intermediate zones for 10 sec., using forty individual grooves, the cycle time represents a considerable reduction of the shortest time known heretofore apart from a simultaneously increased output.

It lies within the scope of the example of the present invention to embody the heating zone divided into two partial ranges in such a manner that, considered in the direction of flow, a first heating zone of, for example, 4 mm width results, followed by a not shown thermally insulating zone of 1 mm, the latter, in turn, is followed by a second heating zone of 2 mm width. Thus it is feasible to set, via a respective heating power control, the first heating zone to a temperature of 72° C. and the second heating zone to a temperature of 92° C. The second heating zone can be followed by a second thermally insulating zone of, for example, 3 mm width, followed by a cooling zone of, for example, 3 mm width kept by a secondary cooling controller at 55° C. A miniaturized thermocycler embodied in such a manner is particularly suited for performing polymerase chain reactions. To this end, via an inlet, a mixture of template, nucleosidtriphosphate, primers, and taq-polymerase in a buffer solution is injected, the respective composition of which is determined according to the state of art. The flow rate is set to about 8 μl/min. so that the duration per period is about 1 minute, 20 sec. falling to the first heating zone, 10 sec. to the second heating zone, 15 sec. to the cooling zone and 5 sec. to each thermal insulating zone. Hence, 40 minutes are required for passing the entire miniaturized thermocycler. During this time, forty amplification cycles take place in a volume unit of 2 μl. When prolonged to 44 minutes (10% prolongation of time) 34 μl are amplified.

The reaction chamber can be easily series produced and is inexpensive, it can be produced over a wide variety of geometries so that an adaptation to varying applications does not involve any difficulties.

I claim:

1. A miniaturized flow thermocycler comprising:

a substrate plate having grooves formed in a plane;

a cover plate having a first surface for covering said substrate plate and sealing said grooves;

means for interconnecting said grooves to form a meandering sample holding channel for receiving and passing liquid media in one direction; and means for applying heating and means for applying cooling to alternating portions of said meandering sample holding channel such that said meandering sample holding channel is alternatingly affected creating a plurality of alternating heating zones and cooling zones for said liquid media which are spaced apart from one another to effect alternating heating and cooling of said liquid media as said liquid media passes continuously through said meandering sample holding channel in said one direction whereby said meandering sample holding channel functions as a continuous reaction chamber having alternating heating and cooling areas.

2. A miniaturized flow thermocycler according to claim 1, wherein:

said substrate plate having said grooves is formed of one of a silicon and a glass, and said grooves are etched in parallel to one another; and said interconnecting means includes bridging channels formed in said cover to interconnect ends of said grooves to form said meandering sample holding channel.

3. A miniaturized flow thermocycler according to claim 2, wherein:

said cover is formed of a silicon sheet;

said cover has at least one thermally insulating notch formed in a second surface opposite said first surface to form a diaphragm in said cover for sealing portions of said grooves below said diaphragm; and said at least one thermally insulating notch being interposed between said means for applying cooling and said means for applying heating thereby serving to thermally isolate said means for applying cooling and said means for applying heating.

4. A miniaturized flow thermocycler according to claim 1, wherein at least one of said heating zones and said cooling zones comprise equally long sample flow sections.

5. A miniaturized flow thermocycler according to claim 1, wherein at least one of the heating zones is divided into spaced apart ranges being subject to different temperatures.

6. A miniaturized flow thermocycler according to claim 1, wherein:

said cover is formed of a silicon sheet;

said cover has at least one thermally insulating notch formed in a second surface opposite said first surface to form a diaphragm in said cover for sealing portions of said grooves below said diaphragm; and said at least one thermally insulating notch being interposed between said means for applying cooling and said means for applying heating thereby serving to thermally isolate said means for applying cooling and said means for applying heating.

7. A miniaturized flow thermocycler apparatus, comprising:

a substrate assembly having a meandering reaction channel in a plane for receiving a liquid media to be passed therethrough in one direction;

said substrate assembly having at least one thermally insulating notch formed in a first surface thereof and substantially parallel to said plane of said meandering reaction channel to form diaphragm portions between a bottom surface of said notch and said meandering reaction channel; and said thermally insulating notch dividing said first surface of said substrate assembly into at least one heating area and one cooling area for applying and removing heat from said meandering reaction channel, respectively, such that said meandering channel has alternating heating and cooling portions separated from one another by portions of said meandering reaction channel defined by said diaphragm portions to permit alternating heating and cooling of said liquid media as said liquid media passes through said meandering reaction channel in said one direction.

8. The miniaturized flow thermocycler apparatus according to claim 7 wherein said substrate assembly comprises:

a base member having parallel grooves formed therein;

a cover member covering said base member;

said cover member having interconnect grooves formed in a first surface of said cover member, said first surface contacting and sealing said parallel grooves, and said interconnect grooves interconnecting said parallel grooves at ends thereof to form said meandering reaction channel; and said cover member having said thermally insulating notch formed in a second surface opposite said first surface, said second surface corresponding to said first surface of said substrate assembly, and said thermally insulating notch being formed perpendicular relative to said parallel grooves.

9. The miniaturized flow thermocycler apparatus according to claim 7 wherein said at least one heating area of said first surface has a heating element formed thereon.

10. The miniaturized flow thermocycler apparatus according to claim 7 wherein at least one of said at least one heating area of said first surface is subdivided by a second thermally insulating notch into two first and second heating areas for heating said liquid media to first and second temperatures respectively.

11. A miniaturized flow thermocycler apparatus, comprising:

a substrate assembly having meandering reaction channel in a plane for receiving a liquid media to be passed therethrough in one direction;

said substrate assembly including a cover member having a first surface covering and sealing said meandering reaction channel;

said cover member having thick areas and thin areas defined by at least one recess formed in a second surface of said cover member opposite said first surface, said thin areas thermally insulating said thick areas from one another;

said thick areas and said thin areas being alternatingly disposed along a path of and adjacent said meandering reaction channel; and alternating ones of said thick areas along said path of said meandering reaction channel being heating areas and cooling areas, respectively, for applying and removing heat from said meandering reaction channel, respectively, such that said meandering reaction channel has alternating heating and cooling portions separated from one another by portions of said meandering reaction channel adjacent said thin areas to permit alternating heating and cooling of said liquid media as said liquid media passes through said meandering reaction channel in said one direction.

* * * * *